(No Model.)
R. R. WILSON.
CANE CUTTER.
No. 415,234. Patented Nov. 19, 1889.
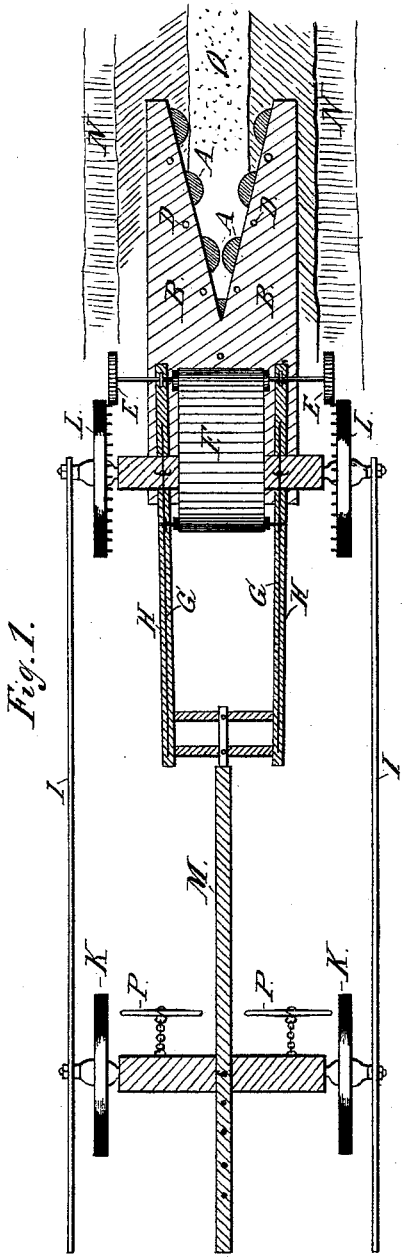
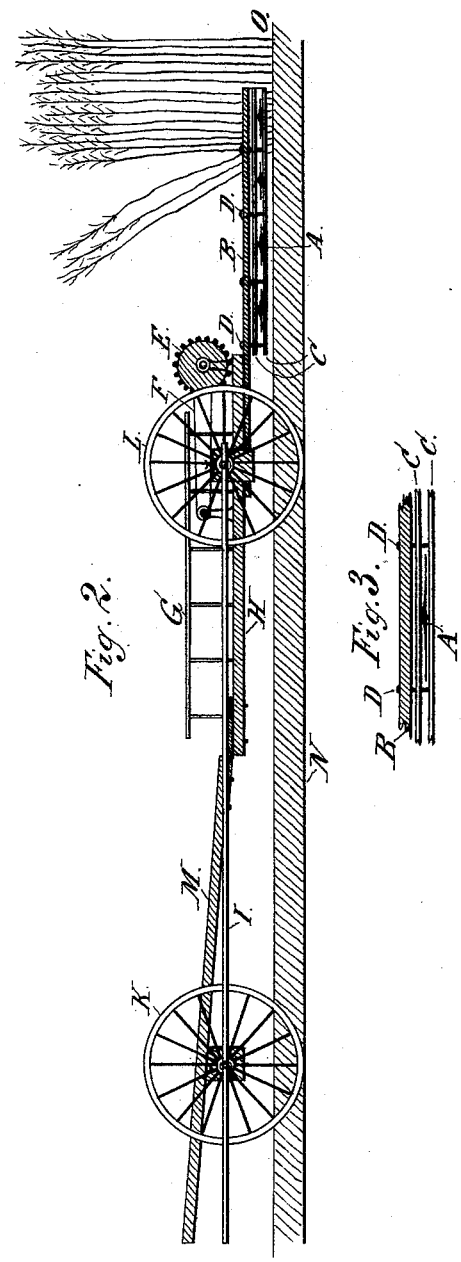
WITNESSES,
Helmuth Holtz
Percy D. Parke.
INVENTOR.
Robert R. Wilson
by W. R. Stringfellow
ATTORNEY.

UNITED STATES PATENT OFFICE.

ROBERT R. WILSON, OF NEW ORLEANS, LOUISIANA.

CANE-CUTTER.

SPECIFICATION forming part of Letters Patent No. 415,234, dated November 19, 1889.

Application filed May 28, 1889. Serial No. 312,407. (No model.)

*To all whom it may concern:*

Be it known that I, ROBERT REDDINGTON WILSON, a citizen of the United States, residing at New Orleans, in the parish of Orleans and State of Louisiana, have invented a certain new and useful Improvement in Cane-Cutters; and I do declare the following to be a full, clear, and exact description of the invention, such as will enable others skilled in the art to which it appertains to make and use the same.

My invention relates to an improvement in a cane-cutter, in which a series of circular knives are made to rotate and operate in conjunction with an endless carrier, and the objects of my improvements are to provide a device that will cut cane. I attain these objects by the mechanism illustrated in the accompanying drawings, in which—

Figure 1 is a top view, and Fig. 2 a side view. Fig. 3 is a side view of knives.

Similar letters refer to similar parts throughout the several views.

In constructing my device I take circular knives of the form as shown in Fig. 3. These knives are securely attached under wooden frame B and within metal frames C, both of which are secured to axles of front wheels, D being a bolt for holding frames B and C.

E are cogged wheels placed on a shaft which rotates carrier F.

G is a side frame.

H are side pieces, and form part of the running-gear.

I are bars attached to axles of wheels K and L, and when in position prevent wheels from getting out of track.

M is a coupling-tongue; N, a furrow; O, a ridge upon which cane stands when growing in the field; P, singletrees for mules.

In operating my invention, place the wheels of my device in furrows N, remove bars I, and attach mules or other motive power at the point indicated by singletrees P, then readjust bars I; the frame B being thus over ridge O, upon which cane grows, as shown in Fig. 2. A forward motion is given, wheels K and L rotate, and knives A come in contact with cane, which is cut near the soil. The cane as cut falls upon carrier F, which also rotates, the wheels E being rotated by wheels L. Cane when upon carrier F is carried through openings between frames G and H and falls upon the ground ready for the mill or diffusion apparatus.

A striking advantage of my device is its simplicity, small cost of construction, and efficiency in cutting cane or corn. When I come to the end of a row, I simply remove bars I, uncouple tongue M, and readily turn my device and continue the work of cutting on an additional row until the entire crop is cut.

Having fully described my invention, what I claim, and desire to secure by Letters Patent, is—

In a cane-cutter, the combination, with the forked frame B, secured to the axle, of the metallic frames composed of the bars C C, the rotary cutters A, journaled in the frames C and extending within the fork of the frame B and along its oblique edges, the frame H, also secured to the axle, the frame G, arranged above the frame H, the endless carrier F, having its forward shaft provided with sprocket-wheels, and the drive-wheels adapted to engage and drive the sprocket-wheels to operate the endless carrier, substantially as specified.

In testimony whereof I affix my signature in presence of two witnesses.

ROBERT R. WILSON.

Witnesses:
CLARENCE J. WADE,
HELMUTH HOLTZ.